2,818,408

STEROID COMPOUNDS AND PROCESS

J Allan Campbell, Kalamazoo Township, John C. Babcock, Portage Township, and John A. Hogg, Kalamazoo Township, Kalamazoo County, Mich., assignors to The Upjohn Company, Kalamazoo, Mich., a corporation of Michigan No Drawing. Application March 29, 1956
Serial No. 574,629

18 Claims. (Cl. 260—239.5)

This invention relates to novel steroids and to a process for their production and use. The novel compounds of the present invention are chemical intermediates in the production of 11β,17α,21-trihydroxy-4,6-pregnadiene-3,20-dione and 21-esters thereof, which compounds possess useful adrenal cortical hormone activity including glusocorticoid and anti-inflammatory activity. They are particularly useful in ointments and creams for topical application for treatment of inflammatory conditions of the eyes, ears and skin due to bacterial inflections, contact dermatitis and allergenic reactions.

The novel compounds of the present invention and a process for their production and use may be graphically illustrated as follows:

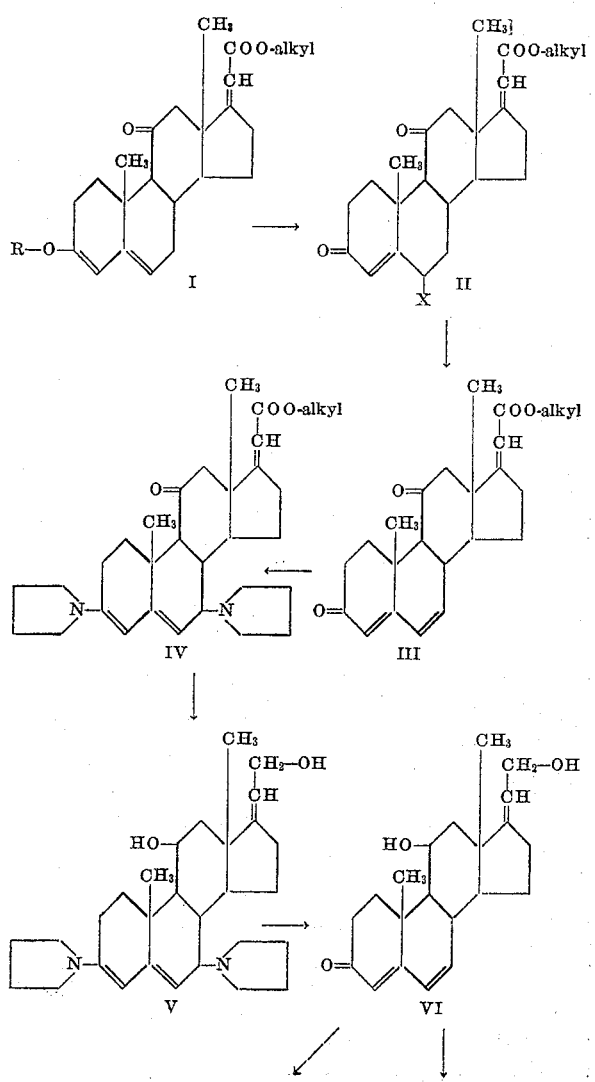

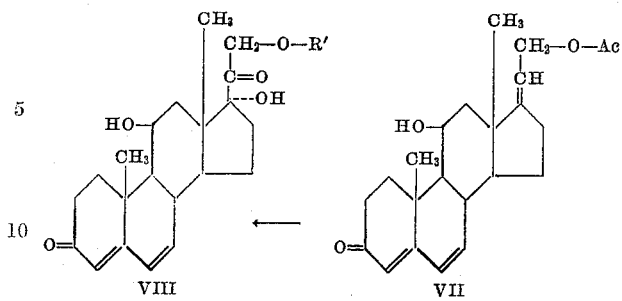

wherein R is an alkyl radical or the acyl radical of a hydrocarbon carboxylic acid containing from one to twelve carbon atoms, inclusive, X is a halogen having an atomic weight from 35 to 127, i. e., chlorine, bromine, or iodine, Ac is the acyl radical of an organic carboxylic acid, preferably a hydrocarbon carboxylic acid containing from one to twelve carbon atoms, inclusive, and R' is hydrogen or Ac as defined hereinabove.

It is an object of this invention to provide the novel alkyl 3,11 - diketo-6-halo-4,17(20)-pregnadien - 21 - oate (II), alkyl 3,11-diketo-4,6,17(20)-pregnatrien-21-oate (III) and the 3,7-dipyrrolidyl enamine thereof (IV), 11β,21-dihydroxy-4,6,17(20)-pregnatrien-3-one (VI), the 3,7-dipyrrolidyl enamine thereof (V) and 21-acyloxy esters thereof (VII). Another object is the provision of a process for the production thereof. Other objects will be apparent to those skilled in the art to which this invention pertains.

Hereinafter, the description of the present invention is made with particular reference to the 17(20)-[cis]-compounds, as these compounds are preferred in the process of this invention. It is to be understood, however, that the process is equally applicable to the 17(20)-[trans]-compounds. The preparation of these latter compounds (I) is shown in Preparation 1, and can be substituted for the corresponding [cis] compounds in the reactions exemplified in the examples.

An 11β,17α-dihydroxy-21-acyloxy-4,6-pregnadiene-3,20-dione is useful as an intermediate in the production of 9α-fluoro-11β,17α-dihydroxy-21-acyloxy - 4,6 - pregnadiene-3,20-dione by the following sequence of reactions: First, dehydration of the 11β-hydroxy group with a mixture of N-bromoacetamide, sulfur dioxide and pyridine or with thionyl chloride or other dehydrating agent to produce 17α-hydroxy-21-acyloxy - 4,6,9(11) - pregnatriene-3,20-dione; second, reaction of the dehydrated product with hypobromous acid, e. g., by reaction with N-bromoacetamide in the presence of aqueous perchloric acid, to produce 9α - bromo - 11β,17α - dihydroxy-21-acyloxy-4,6-pregnadiene-3,20-dione; third, removing the elements of hydrogen bromide from this compound by reaction with potassium acetate in refluxing methanol to produce 9:11-β-oxido-17α-hydroxy-21-acyloxy - 4,6 - pregnadiene-3,20-dione; and fourth, opening the oxido group of the thus-produced compound with hydrogen fluoride according to techniques known in the art, to produce a 9α-fluoro-11β,17α-dihydroxy-21-acyloxy - 4,6 - pregnadiene - 3,20-dione. This latter compound and the corresponding 21-hydroxy compound possess marked glucocorticoid and anti-inflammatory activity.

In carrying out the process of this invention, the conversion of the 3,7-dipyrrolidyl enamine of the alkyl 3,11-diketo-4,6,17(20)-pregnatrien-21-oate (IV) to the 3,7-dipyrrolidyl enamine of 11β,21-dihydroxy-4,6,17(20)-pregnatrien-3-one (V) is accomplished with a chemical reducing agent, preferably a metal hydride reducing agent such as lithium aluminum hydride, sodium aluminum hydride, sodium borohydride catalyzed with AlCl₃ or CaCl₃, etc. The alkyl group of the starting compound (IV) is preferably lower-alkyl of from one to eight carbon atoms, inclusive, e. g., methyl or ethyl, but any alkyl group may be present as it is removed in the reduction. The usual reaction conditions are employed, e. g., dibutyl ether, diethyl ether, benzene, or tetrahydrofuran, etc. can be used as reaction medium, and a reaction temperature between about zero and eighty degrees centigrade can be employed.

The removal of the enamine groups of the reduced product (V) by hydrolysis to produce 11β,21-dihydroxy-4,6,17(20)-pregnatrien-3-one can be accomplished with either aqueous acid or aqueous base; an alkali-metal hydroxide, preferably in aqueous methanol or ethanol, being preferred. The resulting product (VI) can be directly oxidatively hydroxylated according to the method disclosed hereinafter to produce 6-dehydrohydrocortisone (VIII, R=H) but better yields of hydroxylated product are obtained if the 21-hydroxy group is first acylated to produce an 11β-hydroxy-21-acyloxy-4,6,17(20)-pregnatrien-3-one (VII).

The starting 3,7-dipyrrolidyl enamine of an alkyl 3,11-diketo-4,6,17(20)-pregnatrien-21-oate (IV) is prepared by the reaction of pyrrolidine with the free 3-keto compound (III), preferably in the presence of an organic acid catalyst, e. g., a sulfonic acid, under anhydrous conditions. The alkyl 3,11-diketo-4,6,17(20)-pregnatrien-21-oates (III) are prepared by the dehydrohalogenation of the corresponding alkyl 3,11-diketo-6-halo-4,17(20)-pregnadien-21-oate (II) with an organic base, e. g., pyridine, collidine, toluidine, etc., or other known dehydrohalogenating agent, such as lithium chloride in dimethylformamide. The halogen atom is chlorine, bromine or iodine, preferably bromine.

The alkyl 3,11-diketo-6-halo-4,17(20)-pregnadien-21-oates (II) are prepared by the halogenation of the 3-enol ether or 3-enol acylate of alkyl 3,11-diketo-4,17(20)-pregnadien-21-oate (I), e. g., with bromine, chlorine, N-bromoacetamide, N-chlorosuccinimide, N-iodosuccinimide, 1,3-dibromo-5,5-dimethylhydantoin, etc.

The following examples are illustrative of the process and products of the present invention but are not to be construed as limiting.

PREPARATION 1.—METHYL 3-ACETOXY-11-KETO-3,5,17(20)-[CIS]-PREGNATRIEN-21-OATE

A solution of 7.2 grams (0.05 mole) of methyl 3,11-diketo-4,17(20)-[cis]-pregnadien-21-oate and 200 milligrams of para-toluenesulfonic acid in fifty milliliters of acetic anhydride was heated at its refluxing temperature for four hours while bubbling nitrogen through the reaction mixture. The solvent was then removed by distillation at reduced pressure, and the residue was triturated with ethyl acetate and the extract discarded. The residue was then dissolved in fresh ethyl acetate, the solution decolorized with decolorizing charcoal and crystallized by cooling. There was obtained 2.2 grams of methyl 3-acetoxy-11-keto-3,5,17(20)-[cis]-pregnatrien-21-oate melting at 150 to 170 degrees centigrade, having an $\epsilon_{238}$ of 28,850 and an infrared spectrum consistent with the structure.

Methyl 3,11-diketo-4,17(20)-[cis]-pregnadien-21-oate can be prepared according to the method disclosed in U. S. Patent 2,707,184. Ethyl, propyl, or other alkyl-3,11-diketo-4,17(20)-pregnadien-21-oates are similarly prepared and can be used in the foregoing procedure to produce the corresponding alkyl-3-acetoxy-11-keto-3,5,17(20)-[cis]-pregnatrien-21-oate. Alternatively, these compounds can first be converted to the corresponding methyl 3,11-diketo-4,17(20)-[trans]-pregnadien-21-oate by refluxing in methanol containing sodium methoxide and then used in the foregoing procedure.

PREPARATION 2.—METHYL 3-METHOXY-11-KETO-3,5,17(20)-[CIS]-PREGNATRIEN-21-OATE

To a slurry of 54 grams (0.152 mole) of methyl 3,11-diketo-4,17(20)-[cis]-pregnadien-21-oate, 75 milliliters of methyl orthoformate and 325 milliliters of absolute methanol was added thirty drops of concentrated sulfuric acid with stirring. The mixture was stirred at room temperature for thirty minutes, during which time the desired product precipitated from the resulting solution, and then was cooled for a period of between two and three hours. The precipitated steroid was collected by filtration, washed well with cold methanol and dried to give 48.3 grams, a yield of 86 percent of the theoretical, of methyl 3-methoxy-11-keto-3,5,17(20)-[cis]-pregnatrien-21-oate melting at 179 to 183 degrees centigrade and having an $\epsilon_{235}$ of 27,075.

Example 1.—Methyl 3,11-diketo-6-bromo-4,17(20)-[cis]-pregnadien-21-oate (II)

To a solution of 2.1 grams (5.4 millimoles) of methyl 3-acetoxy-11-keto-3,5,17(20)-[cis]-pregnatrien-21-oate in eighty milliliters of acetone cooled in a cold water bath was added dropwise a solution of 2.2 grams of N-bromoacetamide, two grams of sodium acetate trihydrate, and 2.2 milliliters of glacial acetic acid in forty milliliters of water. A precipitate of starting material formed and an additional 150 milliliters of acetone was added. The solution was stirred at room temperature for a period of three hours. The acetone was removed by distillation at reduced pressure. The concentrate was diluted with ether, and the ether solution was washed with aqueous sodium bicarbonate and then with water. The washed solution was dried, filtered, and the filtrate distilled to dryness. The residue consisted of methyl 3,11-diketo-6-bromo-4,17(20)-[cis]-pregnadien-21-oate which melted at 133 to 140 degrees centigrade with decomposition, had an $\epsilon_{231.5}$ of 20,300 and the analysis below.

Calculated for $C_{22}H_{27}O_4Br$: Br, 18.50. Found: Br, 18.91.

Example 2.—Methyl 3,11-diketo-6-bromo-4,17(20)-[cis]-pregnadien-21-oate (II)

To a solution of 30.0 grams (0.078 mole) of methyl 3-methoxy-11-keto-3,5,17(20)-[cis]-pregnatrien-21-oate in 1,700 milliliters of acetone was slowly added a solution of 36.0 grams of sodium acetate trihydrate, 33 milliliters of glacial acetic acid and 33 grams of N-bromoacetamide in 300 milliliters of water while cooling the mixture sufficiently to maintain the temperature below 23 degrees centigrade. After stirring for 1.5 hours, the mixture was distilled at between 22 to 25 degrees centigrade at reduced pressure until about half the original volume remained. The concentrate was diluted with water and extracted with ether. The ether extract was washed with an aqueous sodium carbonate solution and then with water, dried, and then distilled to dryness. The residue consisted of methyl 3,11-diketo-6-bromo-4,17(20)-[cis]-pregnadien-21-oate having the analysis below.

Calculated for $C_{22}H_{27}O_4Br$: Br, 18.5. Found: Br, 21.5.

Example 3.—Methyl 3,11-diketo-4,6,17(20)-[cis]-pregnatrien-21-oate (III)

The methyl 3,11-diketo-6-bromo-4,17(20)-[cis]-pregnatrien-21-oate obtained according to the method described in Example 2 was heated in 250 milliliters of refluxing collidine under a slow stream of nitrogen for 45 minutes. The mixture was cooled, and the precipitated collidine hydrobromide was removed by filtration. The filtrate was made slightly acidic with 6 N hydrochloric acid and extracted with methylene chloride. The extract was washed with dilute hydrochloric acid, water, dilute sodium hydroxide, and again with water until the washings were neutral. The washed extract was dried and filtered through a bed of Florisil synthetic magnesium silicate. The filtrate was concentrated to dryness, and the residue triturated with ether. The insoluble material was crystallized from methanol to give 13.6 grams of methyl 3,11-diketo-4,6,17(20)-[cis]-pregnatrien-21-oate melting at 180 to 182 degrees centigrade. An analytical sample, obtained by recrystallization of the methyl 3,11-diketo-4,6,17(20)-[cis]-pregnatrien-21-oate from acetone, melted at 183 to 185 degrees centigrade, had an [α]$_D$ of plus 228 degrees in acetone, an $\epsilon_{223}$ of 14,050 and an $\epsilon_{282}$ of 23,075. The ether and methanol mother liquors were combined and distilled to dryness. The residue was dissolved in benzene and poured over a column of 200 grams of Florisil. The column was developed with Skellysolve B containing increasing amounts of acetone. The Skellysolve B plus nine percent acetone to the Skellysolve B plus thirteen percent acetone eluates contained the desired product.

The eluted product consisted of a different crystalline form of the methyl 3,11-diketo-4,6,17(20)-[cis]-pregnatrien-21-oate which melted at 170 to 174 degrees centigrade. A mixture of the two forms melted at 183 to 185 degrees centigrade. This material analyzes as a solvate of acetone. After drying the product at 100 degrees centigrade for several days, the molecule of acetone was lost and the product had the analysis below:

Calculated for $C_{22}H_{26}O_4$: C, 74.55; H, 7.39. Found: C, 74.53; H, 7.12.

*Example 4.—Methyl 3,7-dipyrrolidyl-3,5,17(20)-[cis]-pregnatrien-21-oate (IV)*

A solution of 19.0 grams (0.055 mole) of methyl 3,11-diketo-4,6,17(20)-[cis]-pregnatrien-21-oate and fifty milligrams of para-toluenesulfonic acid in a mixture of 69 milliliters of methylene chloride and nineteen milliliters of pyrrolidine were maintained at room temperature under nitrogen for forty minutes. The mixture was distilled to dryness at reduced pressure and the residue was slurried with a small amount of methanol and the methanol distilled at reduced pressure. A small amount of ether was added which was also distilled at reduced pressure. The product was dried under high vacuum for about three hours. The thus-produced methyl 3,7-dipyrrolidyl-3,5,-17(20)-[cis]-pregnatrien-21-oate had an ultraviolet absorption maximum at 324 mμ in alcohol.

*Example 5.—3,7-dipyrrolidyl-11β,21-dihydroxy-3,5,17-(20)-pregnatrien (V)*

The methyl 3,7-dipyrrolidyl-3,5,17(20)-[cis]-pregnatrien-21-oate from 19.0 grams of methyl 3,11-diketo-4,6,-17(20)-pregnatrien-21-oate obtained according to the method of Example 4 was dissolved in about one liter of dry ether and nine grams of lithium aluminum hydride was added thereto. The solution was stirred for 75 minutes, and then thirty milliliters of saturated ammonium chloride was slowly added to decompose the excess lithium aluminum hydride. The granular precipitate was separated and the filtrate extracted with diethyl ether. The diethyl ether was evaporated, and there was thus-produced 3,7-dipyrrolidyl-11β,21-dihydroxy-3,5,17(20)-[cis]-pregnatriene.

*Example 6.—11β,21-dihydroxy-4,6,17(20)-[cis]-pregnatrien-3-one (VI)*

The ether solution of 3,7-dipyrrolidyl-11β,21-dihydroxy-3,5,17(20)-[cis]-pregnatriene obtained according to the method of Example 5 was mixed with 400 milliliters of methanol and forty milliliters of ten percent aqueous sodium hydroxide. The mixture was maintained at forty degrees centigrade for about fifteen minutes and 25 milliliters of acetic acid was then added. After about one hour the solution was made acidic with dilute hydrochloric acid and extracted with methylene chloride. The extract was washed with dilute sodium hydroxide and water and then dried, filtered and distilled to dryness. The residue consisted of 11β,21-dihydroxy-4,6,17(20)-[cis]-pregnatrien-3-one.

*Example 7.—11β-hydroxy-21-acetoxy-4,6,17(20)-[cis]-pregnatrien-3-one (VII)*

The 11β,21-dihydroxy-4,6,17(20)-[cis]-pregnatrien-3-one obtained according to the method of Example 6 was dissolved in twenty milliliters of pyridine and fifteen milliliters of acetic anhydride and the mixture heated at forty degrees centigrade for four hours. The solution was cooled and then slowly diluted with water. The 10.4 grams of precipitated steroid was removed by filtration, washed with water and dried. After crystallization from acetone the 11β-hydroxy-21-acetoxy-4,6,17(20)-[cis]-pregnatrien-3-one melted at 177 to 181 degrees centigrade. A recrystallized sample melted at 180 to 182 degrees centigrade, had an [α]$_D$ of plus 105 degrees in acetone and an $\epsilon_{286}$ of 26.350.

Calculated for $C_{23}H_{30}O_4$: C, 74.58; H, 8.16. Found: C, 74.88; H, 8.22.

Similarly, 11β,21 - dihydroxy-4,6,17(20)-[cis]-pregnatrien-3-one is converted to other 11β-hydroxy-21-acyloxy-4,6,17(20)-[cis]-pregnatrien-3-ones by esterification of the 21-hydroxy group, e. g., by reaction with the appropriate acid anhydride, acid chloride or bromide, ester by ester exchange, acid in the presence of an esterification catalyst, etc. Examples of 11β-hydroxy-21-acyloxy-4,6,17(20)-[cis]-pregnatrien-3 - ones thus-prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, undecylenic, α-ethylisovaleric, a cyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3-, or 4-methylbenzoic, 2,3-, 2,4-, 2,5-, 2,6-, 3,4-, and 3,5-dimethylbenzoic, ethylbenzoic, 2,4,6-trimethylbenzoic, furoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium, salts), e. g., succinic, glutaric, α-methylglutaric, β - methylglutaric, β,β-dimethylglutaric, adipic, pimelic, suberic, a hydroxy acid, e. g., glycolic, lactic, citric, tartaric, d-malic, d-glyceric, mannonic, gluconic, salicylic, an aminoacid, e. g., glycine, diglycollamic, triglycollamic, methylglycine, dimethylglycine, diethylglycine, para-aminosalicylic, para-aminobenzoic, other heterosubstituted acids, e. g., ethylmercaptoacetic, benzylmercaptoacetic, cyanoacetic, chloroacetic, fluoroacetic, trichloroacetic, trifluoroacetic, thioglycolic, 2,3,4 - trimethoxybenzoic, α-naphthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α - picolinic, indole-2-carboxylic, 6 - hydroxyindolyl - 3 - acetic, N-methylmorpholyl - 2-carboxylic, lysergic, pyrrolyl-2-carboxylic, or other acyl acid.

*Example 8.—11β,21 - dihydroxy - 4,6,17(20)-[cis]-pregnatrien-3-one (VI)*

A solution of 3.0 grams of 11β-hydroxy-21-acetoxy-4,6,17(20)-[cis]-pregnatrien-3 - one and 4.5 grams of potassium carbonate in a mixture of ninety milliliters of eighty percent aqueous methanol was heated at its refluxing temperature for two hours with nitrogen bubbling through the solution. About one half of the solvent was then removed by distillation at reduced pressure. The concentrate was diluted with water and then extracted with methylene chloride. The extract was dried and then concentrated by distillation at atmospheric pressure until crystals began to form. The solution was cooled and filtered. The precipitate was filtered, washed with methylene chloride and dried at sixty degrees for sixteen hours in a vacuum oven. There was obtained 2.75 grams of 11β,21-dihydroxy-4,6,17(20)-[cis]-pregnatrien-3-one as a methylene chloride solvate which melted at 88 to 90 degrees centigrade, had an $e_{286}$ of 23,400 and the analysis below.

Calculated for $C_{21}H_{28}O_3 \cdot CH_2Cl_2$: C, 63.92; H, 7.31; Cl, 17.15. Found: C, 64.71; H, 7.55; Cl, 16.20.

*Example 9.—11β,17α - dihydroxy-21-acetoxy-4,6-pregnadiene-3,20-dione (VIII)*

To a solution of 0.9 gram (0.0243 mole) of 11β-hydroxy-21-acetoxy-4,6,17(20)-[cis]-pregnatrien-3-one in 44 milliliters of dry tertiary butyl alcohol was added successively 0.8 milliliter of pyridine, 5.2 milliliters of N-methylmorpholine oxide peroxide (titer 27.8 milliliters of 0.1 N sodium thiosulfate per milliliter; prepared by the reaction of N-methylmorpholine with two molar equivalents of anhydrous hydrogen peroxide in tertiary butyl alcohol) and 1.3 milligrams of osmium tetroxide in one milliliter of tertiary butyl alcohol. After maintaining the mixture at room temperature for 23 hours, about ten milliliters of five tenths percent aqueous sodium hydrosulfite was added. The mixture was diluted with water and extracted thoroughly with methylene chloride. The extracts were washed with dilute hydrochloric acid, water, dilute aqueous sodium bicarbonate and water and then dried. The dried solution was distilled to dryness. The residue was chromatographed through a column of forty grams of Florisil magnesium silicate. Starting material was eluted with Skellysolve B hexane hydrocarbons plus ten percent acetone and 11β,17α-dihydroxy-21-acetoxy-4,6-pregnadiene-3,20-dione was eluted with Skellysolve B plus eighteen percent acetone. The solvent was removed from the eluates containing the desired product and the residue was crystallized from ethyl acetate to give 11β,17α - dihydroxy-21-acetoxy-4,6-pregnadiene-3,20-dione melting at 153 to 157 degrees centigrade, having an $[\alpha]_D$ of plus 140 degrees in acetone, and an $e_{286}$ of 22,875. The melted steroid, upon scratching, resolidifies and melts at 201 to 206 degrees centigrade. The low melting product is solvated.

Following the same procedure, other 11β-hydroxy-21-acyloxy-4,6,17(20)-[cis]-pregnatrien-3-ones are converted to 11β,17α-dihydroxy-21-acyloxy-4,6-pregnadiene-3,20-diones, e. g., wherein the acyl radical is that of an acid named in the paragraph following Example 7.

We claim:

1. Lower - alkyl - 6 - halo - 3,11 - diketo - 4,17(20)-pregnadien-21-oate represented by the following formula:

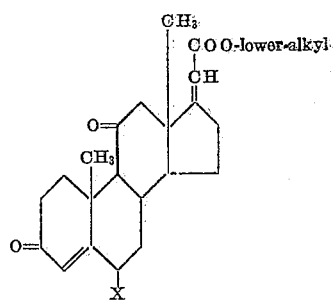

wherein X is a halogen having an atomic weight from 35 to 127, inclusive, and the lower-alkyl group contains from one to eight carbon atoms, inclusive.

2. A compound of claim 1 wherein the halogen is bromine.

3. Methyl 6 - bromo - 3,11 - diketo - 4,17(20) - [cis]-pregnadien-21-oate.

4. Lower - alkyl 3,11 - diketo - 4,6,17(20) - pregnatrien-21-oate represented by the following formula:

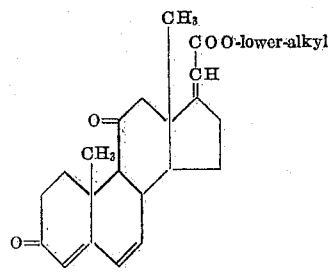

wherein the lower-alkyl group contains from one to eight carbon atoms, inclusive.

5. Methyl 3,11 - diketo - 4,6,17(20) - [cis] - pregnatrien-21-oate.

6. Lower - alkyl 3,7 - dipyrrolidyl - 11 - keto - 3,5,17(20)-pregnatrien-21-oate represented by the following formula:

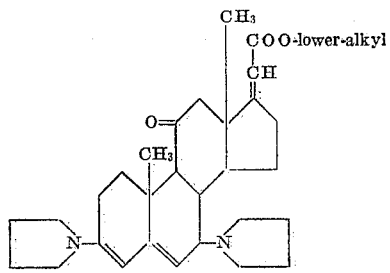

wherein the lower-alkyl group contains from one to eight carbon atoms, inclusive.

7. Methyl 3,7 - dipyrrolidyl - 11 - keto - 3,5,17(20)-[cis]-pregnatrien-21-oate.

8. 3,7 - dipyrrolidyl - 11β,21 - dihydroxy - 3,5,17(20)-pregnatrienes represented by the following formula:

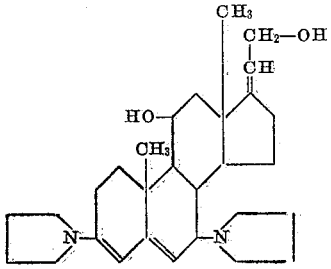

9. 3,7 - dipyrrolidyl - 11β,21 - dihydroxy - 3,5,17(20)-[cis]-pregnatriene.

10. An 11β - hydroxy - 21 - oxy - 4,6,17(20) - pregnatrien-3-one represented by the following formula:

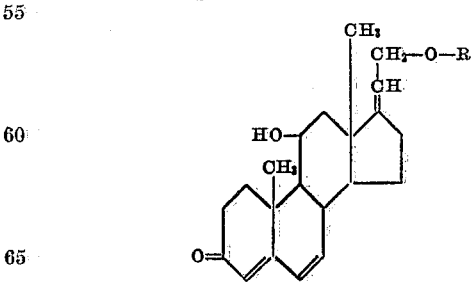

wherein R is selected from the group consisting of hydrogen and the acyl radical of a hydrocarbon carboxylic acid containing from one to twelve carbon atoms, inclusive.

11. 11β - hydroxy - 21 - acyloxy - 4,6,17(20) - pregnatrien-3-one where the acyl radical is that of a hydrocarbon carboxylic acid containing from one to twelve carbon atoms, inclusive.

12. 11β - hydroxy - 21 - acetoxy - 4,6,17(20) - [cis]-pregnatrien-3-one.

13. 11β,21 - dihydroxy - 4,6,17(20) - pregnatrien - 3-one.

14. The process which comprises the steps of (1) reacting alkyl 3,11-diketo-4,6,17(20)-pregnatrien-21-oate with at least two molar equivalents of pyrrolidine to produce the 3,7-dipyrrolidyl enamine thereof represented by the following formula:

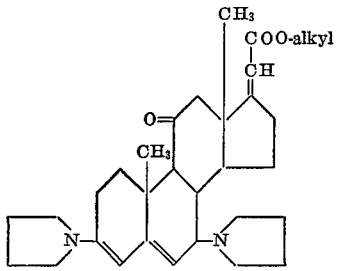

(2) reducing the carbonyl groups of the thus-produced 3,7-dipyrrolidyl enamine with a metal hydride reducing agent to produce the 3,7-dipyrrolidyl enamine of 11β,21-dihydroxy - 4,6,17(20) - pregnatrien - 3 - one represented by the following formula:

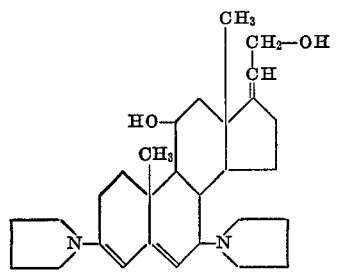

and (3) hydrolyzing the thus-produced 3,7-dienamine of 11β,21 - dihydroxy - 4,6,17(20) - pregnatrien - 3 - one with an alkaline hydrolyzing agent in an aqueous organic solvent to produce 11β,21 - dihydroxy - 4,6,17(20)-pregnatrien-3-one.

15. The process of claim 14 wherein the starting steroid is methyl 3,11 - diketo - 4,6,17(20)-[cis]-pregnatrien-21-oate.

16. The process of claim 14 wherein the starting alkyl 3,11-diketo-4,6,17(20)-pregnatrien-21-oate is prepared by the dehydrohalogenation with an organic base of an alkyl 3,11-diketo-6-halo-4,17(20)-pregnadien-21-oate represented by the following formula:

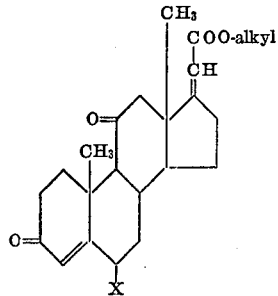

wherein X is a halogen having an atomic weight from 35 to 127, inclusive.

17. The process of claim 14 wherein the starting alkyl 3,11-diketo-4,6,17(20)-pregnatrien-21-oate is prepared by the dehydrobromination with an organic base of alkyl 3,11-diketo-6-bromo-4,17(20)-pregnadien-21-oate.

18. The process of claim 15 wherein the starting alkyl 3,11-diketo-4,6,17(20)-pregnatrien-21-oate is prepared by the dehydrobromination with an organic base of methyl 3,11-diketo-6-bromo-4,17(20)-[cis]-pregnadien-21-oate.

No references cited.